United States Patent Office 3,351,393
Patented Nov. 7, 1967

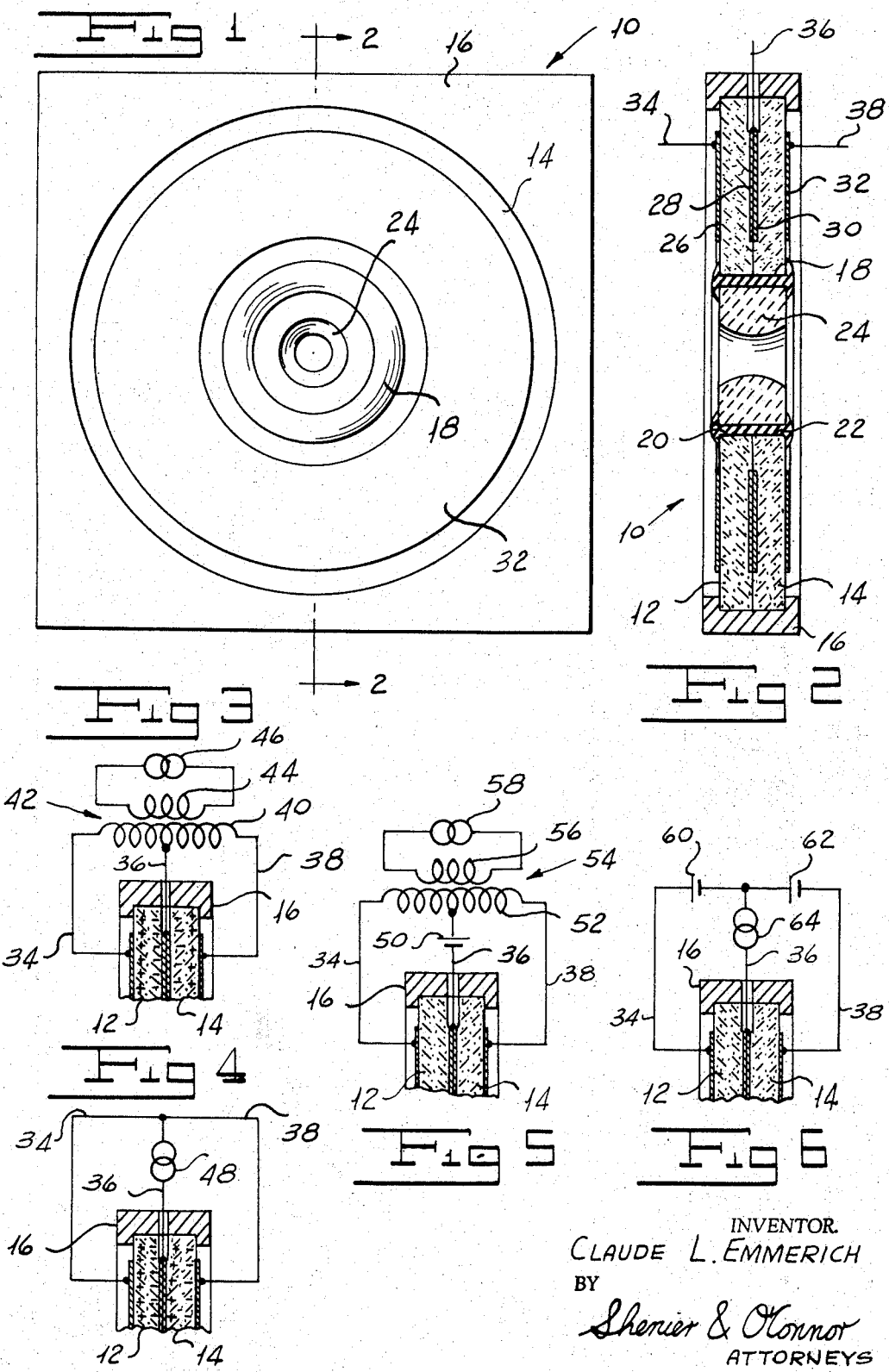

3,351,393
PIEZOELECTRIC OSCILLATING BEARING
Claude L. Emmerich, Scarsdale, N.Y., assignor to United
Aircraft Corporation, East Hartford, Conn., a corporation of Delaware
Filed July 10, 1963, Ser. No. 293,998
5 Claims. (Cl. 308—9)

My invention relates to an oscillating bearing and more particularly to an improved oscillating bearing, the motion of which is amplified over that of structures known in the prior art.

There are known in the prior art various expedients for oscillating bearings of sensitive instruments to reduce the effect of static friction on the performance of the instruments with which the bearings are employed. In earlier systems of the prior art motor-driven linkages have been employed to produce the oscillating motion. Electromagnetic drive systems have also been employed to produce the required motion for overcoming the effect of static friction. Systems of these types have an inherent defect in that they are heavy and cumbersome for the result achieved thereby. It will readily be apparent that systems of this nature are not suitable for use in missiles and the like wherein size and weight are considerations of prime importance.

To overcome the defects of systems of the type pointed out above, it has been suggested that the required movement for overcoming the effect of static friction can be achieved by mounting the bearing surface on a piezoelectric support to which a potential is applied to oscillate the bearing surface to overcome the undesirable effect of static friction. While systems of this nature have proven satisfactory for some applications, the amount of motion produced thereby is extremely small for practical voltages and practical dimensions of the parts.

I have invented an improved oscillating bearing in which the motion of the bearing surface is amplified over that provided by systems of the prior art. My arrangement is relatively light and compact for the result achieved thereby. My improved oscillating bearing does not require an excessively large driving signal to produce the required motion. I so construct my oscillating bearing as to take advantage of the form factor of sensitive instruments such as gyroscopes and accelerometers which use such bearings.

One object of my invention is to provide an improved oscillating bearing having an amplitude of motion which is appreciably greater than that of oscillating bearings of the type known in the prior art.

Another object of my invention is to provide an improved oscillating bearing which does not require an excessively large driving signal.

A further object of my invention is to provide an oscillating bearing which is light and compact.

Still another object of my invention is to provide an oscillating bearing which has a configuration such that it can take advantage of the form factor of instruments such as gyroscopes and accelerometers.

Other and further objects of my invention will appear from the following description.

In general my invention contemplates the provision of a bearing supported by a pair of contiguous discs of oppositely polarized piezoelectric material. In response to a signal applied to the discs, one contracts while the other expands and vice versa to provide a large amplitude of motion of the bearing supported thereby.

In the accompanying drawings which form part of the instant specification and which are to be read in conjunction therewith and in which like reference numerals are used to indicate like parts in the various views:

FIGURE 1 is an elevation of my improved oscillating bearing.

FIGURE 2 is a sectional view of the form of my improved oscillating bearing illustrated in FIGURE 1 taken along the line 2—2 of FIGURE 1.

FIGURE 3 is a schematic view illustrating one way in which I energize my improved oscillating bearing.

FIGURE 4 is a schematic view illustrating another way in which I energize my improved oscillating bearing.

FIGURE 5 is a schematic view illustrating a further way in which I energize my improved oscillating bearing.

FIGURE 6 is a schematic view illustrating a still further way in which I energize my improved oscillating bearing.

Referring now to FIGURES 1 and 2 of the drawings, my improved oscillating bearing indicated generally by the reference character 10 includes a pair of piezoelectric elements 12 and 14 which in the particular embodiment of my invention shown in the drawings are in the form of discs. Any suitable piezoelectric material can be used to make the discs 12 and 14. For example, they can be formed of barium titanate or rochelle salt or the like. The discs 12 and 14 are held in contiguous relationship in a support 16. I so mount the discs as to prevent any relative movement between the facing surfaces thereof so that in response to unequal diametric strains therein the assembly will bow. An annular ferrule 18 formed from a suitable resilient material is disposed in registering openings 20 and 22 in the centers of the discs 12 and 14. The ferrule 18 carries a jewel bearing 24 which is adapted to receive the shaft (not shown) of a sensitive instrument such as a gyroscope or accelerometer, the operation of which might be adversely affected by static friction.

I dispose a thin annular metallic film on both faces of each of the discs 12 and 14. Thus disc 12 has conductive rings 26 and 28 while disc 14 has conductive rings 30 and 32. It will readily be appreciated that when the discs 12 and 14 are assembled in the support 16, the rings 28 and 30 on the surfaces of discs 12 and 14 which face each other are in contact. A conductor 34 and a common conductor 36 permit a signal to be applied across the disc 12. Conductor 36 and conductor 38 permit a signal to be applied across the disc 14. Relative motion between the facing surfaces of discs 12 and 14 is prevented, for example by adhering the surfaces to permit the desired amplification of motion in a manner to be described.

Referring now to FIGURE 3 of the drawings, in one form of my improved oscillating bearing I employ discs 12 and 14 which are oppositely internally polarized. That is, as is indicated by the polarity signs on the figure, disc 12 is polarized positive-to-negative from its lefthand face to its righthand face while disc 14 is internally polarized minus-to-plus from its lefthand face to its righthand face. In this form of my improved bearing I connect the conductors 34 and 38 to the terminals of the secondary winding 40 of a transformer indicated generally by the reference character 42, the primary winding 44 of which is connected to a suitable signal source 46. I connect conductor 36 to a center tap on winding 40. It will be seen that owing to this arrangement, out-of-phase signals are applied to the rings 26 and 32 so that with the polarization of the discs shown, as one disc expands the other contracts so that the motion of the bearing 24 supported on the discs is relatively large as compared to that which would be produced by a single oscillating piezoelectric support.

Referring now to FIGURE 4, I have shown an arrangement in which the polarization of the disc 14 is reversed from that shown in the form of my invention illustrated in FIGURE 3. In this case, however, I connect one terminal of a source 48 to both conductors 34 and 38 and connect the other terminal of the source to the conductor 36. It will be appreciated that this arrangement functions in a manner similar to that of the system shown in FIGURE 3 in that one of the discs 12 and 14 expands while the other contracts and vice versa to produce a large amplitude of motion of the bearing 24.

Referring now to FIGURE 5, I have shown another embodiment of my invention in which the discs 12 and 14 are not internally polarized. In this form of my invention, however, I connect a battery 50 between the conductor 36 and the center tap of a secondary winding 52 of a transformer indicated generally by the reference character 54. I energize the primary winding 56 of transformer 54 from a suitable source 58 of potential. In this arrangement it will readily be apparent that the battery 50 so affects the voltage which is applied to the respective rings 26 and 32 as to produce a bias therein to cause the discs 12 and 14 to act oppositely to produce a relatively large amplitude of oscillation of the bearing 24.

Referring now to FIGURE 6, I have shown a somewhat different arrangement in which I apply respective biasing voltages to the conductive rings 26 and 32 by batteries 60 and 62 having a common terminal. I then apply an energizing signal by connecting the source 64 between conductor 36 and the common terminal of the batteries 60 and 62.

In operation of my improved oscillating bearing I polarize the two discs 12 and 14 oppositely either by employing internally polarized piezoelectric material or by applying appropriate direct current potentials thereto. I then energize the bearing from a suitable source of alternating current. In response to this energization strains are induced in the two discs 12 and 14 in a direction parallel to the common axis of the discs. The strain is such that one of the discs tends to expand while the other tends to contract. Owing to these strains one of the discs tends to increase in diameter while the other tends to decrease. As a result of this action, since no relative motion is permitted between the facing surfaces of the two discs, they tend to bow alternately in one direction and the other so that a relatively large amplitude of motion is imparted to the bearing 24. The action of my discs in producing the motion of the bearing is analogous to the amplified motion of temperature responsive bimetallic devices of the prior art.

It will be seen that I have accomplished the objects of my invention. I have provided an improved oscillating bearing having an amplitude of motion which is appreciably greater than is the amplitude of motion of oscillating bearings of the type known in the prior art. My oscillating bearing does not require an excessively large driving signal to produce such motion as is necessary to overcome the effect of static friction. My oscillating bearing is relatively light and compact for the result achieved thereby. The configuration of my bearing is such that it takes advantage of instruments such as gyroscopes and accelerometers with which it is particularly adapted to be used.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing assembly including in combination a pair of plate-like elements of piezoelectric material, said elements being provided with central openings, means comprising a peripheral support for mounting said elements in contiguous relationships with said openings aligned, a bearing for supporting an element for rotary movement around an axis, resilient means disposed in said aligned openings and in contiguous relationship with said elements and said bearing for carrying said bearing in said aligned openings, a source of an alternating current signal, and means for coupling said signal to said elements respectively to cause said elements to oscillate in opposite senses to produce an amplified oscillating movement of said bearing in the direction of said axis.

2. A bearing assembly as in claim 1 in which said elements are internally polarized, said elements being supported with contiguous faces of opposite polarity, said signal applying means applying said signal as out-of-phase signals.

3. A bearing assembly as in claim 1 in which said elements are internally polarized, said elements being supported with contiguous faces of like polarity, said signal applying means applying said signal as inphase signals.

4. A bearing assembly as in claim 1 including means for applying a direct current bias of a certain polarity across said elements, said signal applying means applying said signal to said elements as out-of-phase signals.

5. A bearing assembly as in claim 1 including means for applying direct current biases of opposite polarity across said elements, said signal applying means applying said signal as inphase signals.

References Cited

UNITED STATES PATENTS

| | | | |
|---|---|---|---|
| 408,465 | 8/1889 | Dewey | 308—1 |
| 2,167,254 | 7/1939 | Skellett | 310—8.6 X |
| 2,746,813 | 5/1956 | Massa | 308—1 |
| 2,993,739 | 7/1961 | Hall | 308—1 |
| 3,067,345 | 12/1962 | Harris | 310—8.7 |
| 3,072,805 | 1/1963 | Rich | 310—8.1 |
| 3,239,283 | 3/1966 | Broeze et al. | 308—9 |

MARTIN P. SCHWADRON, *Primary Examiner.*

DAVID J. WILLIAMOWSKY, *Examiner.*

R. F. HESS, *Assistant Examiner.*